(12) United States Patent
Silcoff et al.

(10) Patent No.: US 8,669,034 B2
(45) Date of Patent: Mar. 11, 2014

(54) TREATED FLUOROPOLYMER PARTICLES, METHODS OF MAKING TREATED FLUOROPOLYMER PARTICLES, TONER COMPOSITIONS, AND METHODS OF MAKING TONER COMPOSITIONS

(75) Inventors: Elliad Silcoff, Rehovot (IL); Gili Assaf, Rehovot (IL); Gil Bar-Haim, Rehovot (IL); Albert Teishev, Rehovot (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 99 days.

(21) Appl. No.: 13/122,522

(22) PCT Filed: Oct. 7, 2008

(86) PCT No.: PCT/US2008/079052
§ 371 (c)(1),
(2), (4) Date: Apr. 4, 2011

(87) PCT Pub. No.: WO2010/042111
PCT Pub. Date: Apr. 15, 2010

(65) Prior Publication Data
US 2011/0189606 A1   Aug. 4, 2011

(51) Int. Cl.
*G03G 9/00* (2006.01)
(52) U.S. Cl.
USPC ............ 430/115; 430/112; 430/114; 524/805
(58) Field of Classification Search
USPC .......... 524/167, 544, 755, 805; 430/112, 113, 430/114, 115, 116
See application file for complete search history.

(56) References Cited

U.S. PATENT DOCUMENTS

| | | | |
|---|---|---|---|
| 3,880,798 A | 4/1975 | Deem et al. | |
| 4,547,457 A | 10/1985 | Grubb et al. | |
| 4,756,991 A | 7/1988 | Grubb | |
| 4,879,362 A | 11/1989 | Morgan | |
| 4,952,636 A | 8/1990 | Morgan et al. | |
| 5,034,298 A | 7/1991 | Berkes et al. | |
| 5,104,762 A | 4/1992 | Shirose et al. | |
| 5,208,130 A | 5/1993 | Almog et al. | |
| 5,328,794 A * | 7/1994 | Kazuo et al. | 430/109.3 |
| 5,451,483 A | 9/1995 | Fuller et al. | |
| 5,607,806 A | 3/1997 | Kanbayashi et al. | |
| 6,100,318 A | 8/2000 | Zipplies | |
| 6,409,811 B1 | 6/2002 | Tavares et al. | |
| 6,528,574 B1 | 3/2003 | Levy et al. | |
| 6,881,784 B2 | 4/2005 | Cody et al. | |
| 6,899,987 B2 | 5/2005 | Vanbesien et al. | |
| 6,911,488 B2 | 6/2005 | Cody et al. | |
| 2005/0228127 A1* | 10/2005 | Tatemoto et al. | 524/805 |
| 2006/0276574 A1 | 12/2006 | Hoshikawa et al. | |

FOREIGN PATENT DOCUMENTS

| | | |
|---|---|---|
| DE | 3333121 A1 | 9/1983 |
| EP | 1612809 A1 | 1/2006 |
| JP | 3242656 A | 10/1991 |

(Continued)

OTHER PUBLICATIONS

English Translation of JP-05066612A.*

*Primary Examiner* — Stewart Fraser

(57) ABSTRACT

Toner compositions, treated fluoropolymer particles, methods of making treated fluoropolymer particles, and the like, are disclosed.

21 Claims, 2 Drawing Sheets

(56) References Cited

FOREIGN PATENT DOCUMENTS

| | | | |
|---|---|---|---|
| JP | 4306666 A | 10/1992 | |
| JP | 5066612 A | 3/1993 | |
| JP | 05066612 A | * 3/1993 | |
| JP | 7110594 A | 4/1995 | |
| JP | 9146371 A | 6/1997 | |
| JP | 200723088 | 2/2007 | |
| JP | 2008065330 A | 3/2008 | |

* cited by examiner

TREATED FLUOROPOLYMER PARTICLES, METHODS OF MAKING TREATED FLUOROPOLYMER PARTICLES, TONER COMPOSITIONS, AND METHODS OF MAKING TONER COMPOSITIONS

RELATED APPLICATION

The present application claims the priority under 35 U.S.C. 119(a)-(d) or (f) and under C.F.R. 1.55(a) of previous International Patent Application No. PCT/US2008/079052, filed Oct. 7, 2008, entitled "Treated Fluoropolymer Particles, Methods of Making Treated Fluoropolymer Particles, Toner Compositions, and Methods of Making Toner Compositions" which application is incorporated herein by reference in its entirety.

BACKGROUND

Various techniques for electrostatic image transfer are known. One method includes the use of an intermediate transfer member. A liquid image, which includes a liquid carrier having ink particles dispersed therein, is transferred from a photoconductive surface of a photoconductive member or drum to a surface (e.g., a release layer or blanket) of the intermediate transfer member. The liquid image is attracted from the photoconductive surface to the surface of the intermediate transfer member. The liquid carrier is removed from the surface of the intermediate transfer member and the ink particles are compacted on the surface in the image configuration. Thereafter, the ink particles are transferred from the surface of the intermediate transfer member to a substrate in the image configuration by thermal attraction.

Modern liquid toner electrostatic imaging began with the invention of a new class of toners referred to as ElectroInk™. This type of toner (also referred to as ink formulation) is characterized by its toner particles being dispersed in a carrier liquid, where the toner particles include a core of a polymer with fibrous extensions extending from the core. When the toner particles are dispersed in the carrier liquid in a low concentration, the particles remain separate. When the toner develops an electrostatic image, the toner particles come together and the fibrous extensions interlock. A large number of patents and patent applications are directed toward this type of toner (e.g., U.S. Pat. Nos. 4,794,651; 5,047,306; and 5,208,130). It has been discovered that this type of toner allows for high quality offset printing at high speed. This type of printing is described in the following U.S. Pat. Nos. 4,678,317; 4,860,924; 4,980,259; 4,985,732; 5,028,964; and 5,034,778.

However, the electrostatic imaging inks can suffer from deficiencies relating to agglomeration of PTFE in the electrostatic imaging ink. The agglomeration of PTFE under an electrical field is a known process. The agglomeration of the PTFE can cause print quality defects called white spots (1 to 2 micron voids, FIG. 1). This deficiency is exhibited in solid prints, which can show a large number of white spots or voids. The voids significantly reduce the quality of print, and in some industries, the prints are not usable. Therefore, a need exists in the art for ink formulations to overcome at least this deficiency.

SUMMARY

Briefly described, embodiments of this disclosure include toner compositions, ink compositions, treated fluoropolymer particles, methods of making a treated fluoropolymer particle, and the like. One exemplary embodiment of a toner composition, among others, includes: a carrier liquid, a resin, and treated fluoropolymer particles, wherein the treated fluoropolymer particles include fluoropolymer particles having ammonium halide salts disposed on the surface of the fluoropolymer particles.

One exemplary embodiment of a particle, among others, includes: a treated fluoropolymer particle, where the treated fluoropolymer particle includes a fluoropolymer particle having ammonium halide salts disposed on the surface of the fluoropolymer particle, wherein the treated fluoropolymer particles do not substantially agglomerate under and electrical fields.

One exemplary embodiment of a method of making a treated fluoropolymer particle, among others, includes: dispersing fluoropolymer particles in a solvent; treating the fluoropolymer particles with a solution of ammonium halide salts to form treated fluoropolymer particles, wherein the ammonium halide salts disposed onto the surface of the fluoropolymer particles; removing any non-bonded or non-absorbed ammonium halide salts from the treated fluoropolymer particles; and mixing the treated fluoropolymer particles with a carrier liquid and a resin.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

According to an embodiment of the present invention.

DETAILED DESCRIPTION

Figure 1:
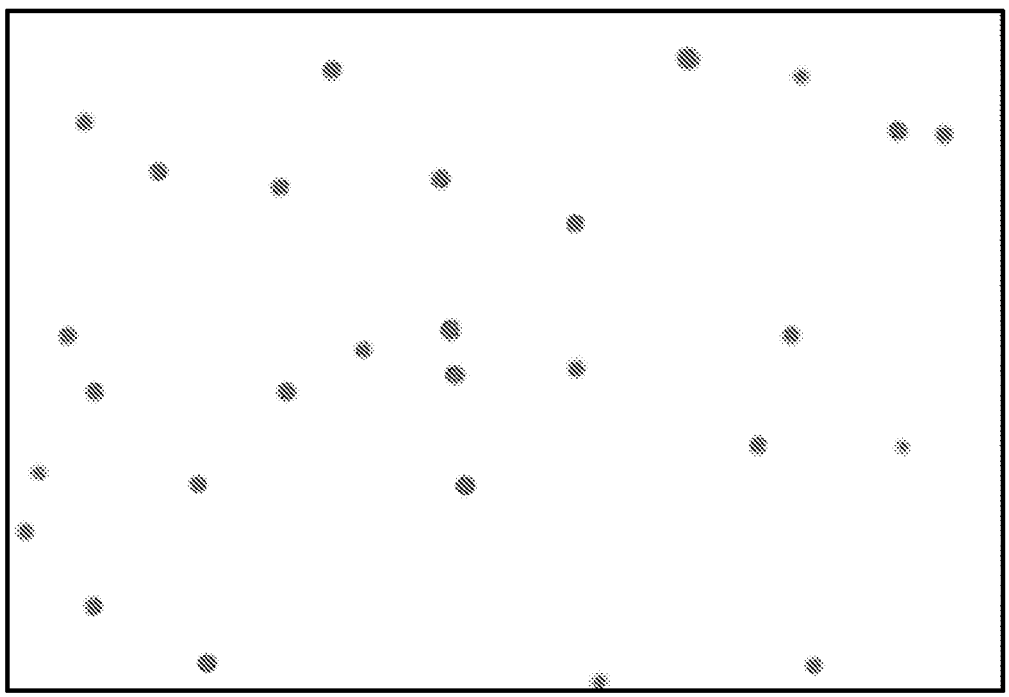
FIG. 1 illustrates the appearance of white spots in 100% coverage of cyan print sheet. Please note that the color is inversed so that the cyan is lighter and the white spots are darker, so lighter area corresponds to cyan and the darker spots correspond to the white spots.

Embodiments of the present disclosure will employ, unless otherwise indicated, techniques of synthetic organic chemistry, ink chemistry, solvent chemistry, and the like, that are within the skill of the art. Such techniques are explained fully in the literature.

The following examples are put forth so as to provide those of ordinary skill in the art with a complete disclosure and description of how to perform the methods and use the compositions disclosed and claimed herein. Efforts have been made to ensure accuracy with respect to numbers (e.g., amounts, temperature, etc.) but some errors and deviations should be accounted for. Unless indicated otherwise, parts are parts by weight, temperature is in ° C., and pressure is at or near atmospheric. Standard temperature and pressure are defined as 20° C. and 1 atmosphere.

Before the embodiments of the present disclosure are described in detail, it is to be understood that, unless otherwise indicated, the present disclosure is not limited to particular materials, reagents, reaction materials, manufacturing and test processes, or the like, as such can vary. It is also to be understood that the terminology used herein is for purposes of describing particular embodiments only, and is not intended to be limiting. It is also possible in the present disclosure that steps can be executed in different sequence where this is logically possible.

It must be noted that, as used in the specification and the appended claims, the singular forms "a," "an" and "the" include plural referents unless the context clearly dictates otherwise. Thus, for example, reference to "a support" includes a plurality of supports. In this specification and in the claims that follow, reference will be made to a number of terms that shall be defined to have the following meanings unless a contrary intention is apparent.

Discussion

Embodiments of the present disclosure include treated fluoropolymer particles, methods of making treated fluoropolymer particles, electrostatic ink formulations, methods of making electrostatic ink formulations, toner compositions, methods of making toner compositions, and the like. Embodiments of the treated fluoropolymer particle include a fluoropolymer particle having ammonium halide salts disposed (e.g., bonded) on the surface of the fluoropolymer particle. The term "disposed" as used in this disclosure as it relates to ammonium halide salts and fluoropolymer particles means a physical and/or chemical interaction (e.g., bond, bonded, bound, absorbed, and the like) in which the surfactant salt is adsorbed and/or bonded on the polymer surface by Van der Waal forces or other weak chemical forces. The ammonium halide salts have a long hydrophobic tail (e.g., a tail having at least 6 carbon atoms in the chain), with many hydrophobic sites. Thus, despite the weak interaction noted above, an efficient adsorption is obtained by the sum of the many hydrophobic sites along the tail and their interaction with the particle.

Treated fluoropolymer particles are advantageous because the treatment of the fluoropolymer particles (as opposed to untreated fluoropolymer particles) substantially reduces or eliminates agglomeration of the treated fluoropolymer particles when under an electrical field. Although not intending to be bound by theory, untreated fluoropolymer particles (Teflon particles) tend to charge with a static electric field with a high degree of polarity. This, in turn, leads to formation of large agglomerates because the fluoropolymer particles stack onto one another. Typical agglomerate sizes seen on electrostatic presses are in excess of 4 microns to 1 mm for the primary particles.

Although not intending to be bound by theory, in embodiments of the present disclosure, the long chains of the ammonium halide salts disposed on the fluoropolymer particles appear to stretch out into the liquid phase creating an electrical boundary, but more importantly a physical boundary. This boundary is in excess of the Gouey-Chapmen level, and hence, electrostatic bonds are incapable of forming. Thus, in an embodiment, the agglomeration appears to be prevented when a well ordered monolayer of ammonium halide salt is disposed onto the fluoropolymer particle. In another embodiment, the ammonium halide salts do not have a long tail and these can be used in electrical buffering. In this embodiment, the presence of the polar salt on the surface has the ability to discharge the static charge formed at a much quicker rate and thus negate the forces to create an agglomeration of the particles. It should be noted that one or both of these processes could be operating in embodiments where the ammonium halide salts have long tails.

In an embodiment, the treatment substantially reduces by about 85% 90%, 95%, or 99% or more or eliminates agglomeration of the treated particles when under an electrical field. The electrophoretic development of ink particles is not blocked by the fluoropolymer particles, and all the pixels are filled by ink to give a solid print sheet.

Embodiments of the present disclosure include methods of making treated fluoropolymer particles. The fluoropolymer particles are dispersed in a solvent (e.g., methanol, ethanol, water, other alkyl or aryl alcohols, tetrahydrofuran, dimethylformamide, dimethyl sulfoxide, other polar solvents, and combinations thereof, where the amount of solvent is large enough to separate the particles and prevents a rapid sedimentation. Then, the fluoropolymer particles are treated with a solution of ammonium halide salts. In another embodiment, the ammonium halide salts could be added to the solvent prior to the addition of the fluoropolymer particles. The ratio of the amount of fluoropolymer particles and the amount of ammonium halide salts is in the range of about 1 to 2 to about 2 to 1. In an embodiment, the ratio is about 1 to 2 when the ammonium halide has long tails. The term "long tails" refers to a tail of at least 6 carbon units. The tail can include saturated, unsaturated, or polyunsaturated carbon chains, which is described in more detail below. In an embodiment, 1, 2, or 3 tails can be attached to the nitrogen of the ammonium halide salts. The ammonium halide salts interact with (become disposed on) the ammonium halide salts to form treated fluoropolymer particles. In particular, the ammonium halide salts form a bond or are absorbed on the surface of the fluoropolymer particles. The treatment can occur at standard pressure and room temperature for at least 12 hours in a shaker or a sonicator. Once the treatment is complete, the non-bonded or non-absorbed ammonium halide salts are removed or rinsed from the treated fluoropolymer particles. Additional details regarding the enhanced characteristics are described in the Examples.

The fluoropolymer particles are made from fluoropolymers. Fluoropolymers and methods of making fluoropolymer particles from fluoropolymers and fluorinated monomers are known in the art. As used herein the term "fluoropolymers" includes polymers that are made from at least one fluorine-containing monomer. In an embodiment, the fluoropolymer can include monomer(s) that contain no fluorine or other halogen. E. I. du Pont de Nemours sells a known fluoropolymer under the tradename "TEFLON". TEFLON can have one or more of the following chemical formulations: polytetrafluoroethylene (PTFE), perfluoroalkoxy polymer resin (PFA), and fluorinated ethylene-propylene (FEP).

In particular, fluoropolymers can include a fluorine-containing polymer including homopolymers, copolymers, and terpolymers. In addition, the fluoropolymers can include a fluoroelastomer. Embodiments of the present disclosure can include fluoro-homopolymers such as, but not limited to, polytetrafluoroethylene (PTFE), polytrifluoroethylene, polyvinylidene fluoride (PVDF), polychlorotrifluoroethylene (PCTFE), polyvinyl fluoride (PVF), and the like. Embodiments of the present disclosure can include fluoro-copolymers such as, but not limited to, ethylene and chlorotrifluoroethylene copolymers, fluorinated ethylene-propylene (FEP) copolymers, ethylene and tetrafluoroethylene copolymers, tetrafluoroethylene and perfluorovinylether copolymers, vinylidene fluoride and hexafluoropropene copolymers (fluoroelastomers), and a combination of the homopolymers described above. Embodiments of the present disclosure can include fluoro-terpolymers such as, but not limited to, vinylidene fluoride, hexafluoropropene and tetrafluoroethylene (terpolymer fluoroelastomers), tetrafluoroethylene-hexafluoropropylene-vinylidene fluoride, and combinations of the homopolymers and/or co-polymers described above.

In an embodiment, the fluoropolymers are made with one or more of the following specific examples of fluoromonomers including: tetrafluoroethylene, hexafluoropropylene, vinylidene fluoride, vinyl fluoride, trifluoroethylene, chlorotrifluoroethylene, and perfluorovinylethers. In an embodiment, the fluoropolymer is polytetrafluoroethylene (PTFE).

As mentioned above, the fluoropolymer particles are treated with an ammonium halide salt. The ammonium halide salt can include, but is not limited to, alkyl ammonium anion salts, dialkyl ammonium salts, trialkyl ammonium salt, quaternary ammonium salts, mono-, di-, tri-, and tetra-arylammonium salts and combinations thereof. The anion can be a halide (Cl, F, Br, and I), or other negative anion such as, but not limited to, triflate, tosylate, benzoate, or carboxylate.

The alkyl ammonium halide salts can include, but are not limited to, mono-, di-, and tri-alkyl ammonium halide salts. The alkyl group can include saturated aliphatic groups including straight-chain alkyl groups, branched-chain alkyl groups, cycloalkyl (alicyclic) groups, alkyl substituted cycloalkyl groups, and cycloalkyl substituted alkyl groups. The term "alkyl" can refer to straight or branched chain hydrocarbon groups, such as methyl, ethyl, n-propyl, i-propyl, n-butyl, i-butyl, t-butyl, pentyl, hexyl, heptyl, octyl, and the like. The term "cycloalkyl" can have from about 3 to about 10 carbon atoms in their ring structure, and alternatively about 5, 6, or 7 carbons in the ring structure. The term "alkyl" is also defined to include halosubstituted alkyls and heteroatom substituted alkyls.

The term "quaternary ammonium salt" as used herein is defined to include a material that has four separate groups (not necessarily the same) that are bonded to the central nitrogen to produce a positively-charged quaternary ammonium ion (a cation). The positive charge of this cation is balanced by a selected anion. One or more of the groups will contain one or more carbon atoms. An embodiment of the quaternary ammonium salt can be defined by the following structural formula: Anion+N(R1)(R2)(R3)(R4).

In this formula, R1, R2, R3, and R4 may each be independently selected from a wide variety of organic groups including, but not limited to, H, aliphatic groups, and/or aromatic groups, where at least one of R1, R2, R3, and R4 is organic in character. The quaternary ammonium salt can be symmetrical or unsymmetrical. The aliphatic (e.g., alkanes, alkenes, and alkynes) and/or aromatic groups may be substituted or non-substituted and/or branched or non-branched.

The substituted groups for aliphatic groups can include, but are not limited to, a hydroxyl, a halogen (fluorine, chlorine, bromine, and iodine), a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a cyano, a nitro, an azido, a sulfhydryl, an alkylthio, a sulfate, a sulfonate, a sulfamoyl, a sulfonamido, a sulfonyl, a heterocyclic, an aralkyl, or an aromatic or heteroaromatic group. It will be understood by those skilled in the art that the groups substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthiols, carbonyls (including ketones, aldehydes, carboxylates, and esters), —CN, and the like.

The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclic, aromatic or heteroaromatic moieties, —CF$_3$, —CN, or the like.

The anion can include, but is not limited to, iodine ion, bromine ion, chlorine ion, iodic acid ion, bromic acid ion, chloric acid ion, periodic acid ion, perchloric acid ion, chlorous acid ion, hypochlorous acid ion, nitric acid ion, nitrous acid ion, sulfuric acid ion, hydroxyl group ion, tosylate, triflate, acetate, and other carboxylates and the like.

In an embodiment, the quaternary ammonium salt can include, but is not limited to, hydroxylammonium chloride, tetramethylammonium chloride, tetraethylammonium chloride, tetraheptylammonium bromide, didodecyldimethylammonium bromide, benzyldimethylhexadecylammonium chloride, and tridodecylmethylammonium bromide.

Electrostatic Toner and Ink Compositions

As mentioned above, embodiments of the present disclosure include toner compositions (or toner concentrates) and electrostatic inks including treated fluoropolymer particles. Embodiments of the toner compositions, in particular, electrostatic toner composition formulations (also referred to as "electrostatic ink") include treated fluoropolymer particles, a carrier liquid, and a resin. In addition, the ink formulation may include one or more of the following: a colorant, a charge adjuvant, a charge director, a surface modifier, compatibility additives, charging additives, transfer additives, and other additives. Embodiments of the toner composition are advantageous because the treatment of the fluoropolymer particles (as opposed to untreated fluoropolymer particles) substantially reduces agglomeration of the treated fluoropolymer particles when under an electrical field, as described in detail above. Reduction or elimination of the agglomeration reduces or eliminates the white spots or voids that are formed during printing, which significantly increases the print quality of the toner composition. Additional details regarding the enhanced characteristics are described in the Examples.

The carrier liquid can include, but is not limited to, an insulating, nonpolar liquid that is used as the medium for toner particles. The carrier liquid can include compounds that have a resistivity in excess of about $10^9$ ohm-cm and a dielectric constant below about 3.0. The carrier liquid can include, but is not limited to, hydrocarbons. The hydrocarbon can include, but is not limited to, an aliphatic hydrocarbon, an isomerized aliphatic hydrocarbon, branched chain aliphatic hydrocarbons, aromatic hydrocarbons, and combinations thereof.

Embodiments of the carrier liquids include, but are not limited to, aliphatic hydrocarbons, isoparaffinic compounds, paraffinic compounds, dearomatized hydrocarbon compounds, and the like. In particular, the carrier liquids can include, but are not limited to, Isopar-G™, Isopar-H™, Isopar-L™, Isopar-M™, Isopar-K™, Isopar-V™, Norpar 12™, Norpar 13™, Norpar 15™, Exxol D40™, Exxol D80™, Exxol D100™, Exxol D130™, and Exxol D140™ (each sold by EXXON CORPORATION); Teclen N-16™, Teclen N-20™, Teclen N-22™, Nisseki Naphthesol L™, Nisseki Naphthesol M™, Nisseki Naphthesol H™, #0 Solvent L™, #0 Solvent M™, #0 Solvent H™, Nisseki Isosol 300™, Nisseki Isosol 400™, AF-4™, AF-5™, AF-6™ and AF-7™ (each sold by NIPPON OIL CORPORATION); IP Solvent 1620™ and IP Solvent 2028™ (each sold by IDEMITSU PETROCHEMICAL CO., LTD.); Amsco OMS™ and Amsco 460™ (each sold by AMERICAN MINERAL SPIRITS CORP.); and Electron, Positron, New II, Purogen HF (100% synthetic terpenes) (sold by ECOLINK™). The carrier liquids and other components of the present disclosure are described in U.S. Pat. No. 6,337,168, U.S. Pat. No. 6,070,042, and U.S. Pat. No. 5,192,638.

In an embodiment, the carrier liquid can be about 20 to 95% by weight of the toner composition. In another embodiment, the carrier liquid can be about 40 to 90% by weight of the toner composition. In another embodiment, the carrier liquid can be about 60 to 80% by weight of the toner composition.

The resin can include, but is not limited to, thermoplastic toner resins. In particular, the resin can include, but is not limited to, ethylene acrylic acid copolymers; methacrylic acid copolymers; ethylene vinyl acetate copolymers; copolymers of ethylene (80% to 99.9%), acrylic, or methacrylic acid (0.1% to 20.0%)/alkyl (C1 to C5) ester of methacrylic or acrylic acid (0.1% to 20%); polyethylene; polystyrene; isotactic polypropylene (crystalline); ethylene ethyl acrylate; polyesters; polyvinyl toluene; polyamides; styrene/butadiene copolymers; epoxy resins; acrylic resins (e.g., copolymer of acrylic or methacrylic acid and at least one alkyl ester of acrylic or methacrylic acid wherein alkyl is from 1 to about 20 carbon atoms, such as methyl methacrylate (50% to 90%)/methacrylic acid (0% to 20%)/ethylhexylacrylate (10% to 50%)); ethylene-acrylate terpolymers: ethylene-acrylic esters-maleic anhydride (MAH) or glycidyl methacrylate (GMA) terpolymers; low molecular weight ethylene-acrylic acid ionomers and combinations thereof. In an embodiment, the resin is about 5 to 80% by weight of the toner composition. In another embodiment, the resin is about 10 to 60% by weight of the toner composition. In another embodiment, the resin is about 15 to 40% by weight of the toner composition.

In an embodiment, the resin can include the Nucrel family of toners (e.g., Nucrel 403™, Nucrel 407™, Nucrel 609HS™, Nucrel 908HS™, Nucrel 1202HC™, Nucrel 30707™, Nucrel 1214™, Nucrel 903™, Nucrel 3990™, Nucrel 910™, Nucrel 925™, Nucrel 699™, Nucrel 599™, Nucrel 960™, Nucrel RX 76™, Nucrel 2806™, Bynell 2002, Bynell 2014, and Bynell 2020 (sold by E. I. du PONT)), the Aclyn family of toners (e.g., Aaclyn 201, Aclyn 246, Aclyn 285, and Aclyn 295), and the Lotader family of toners (e.g., Lotader 2210, Lotader, 3430, and Lotader 8200 (sold by Arkema)).

In an embodiment, the toner composition can include a colorant. The colorants can include organic and/or inorganic colorants. The colorant can be a dye or pigment. The colorants can include, but are not limited to, cyan colorants, magenta colorants, yellow colorants, violet colorants, orange colorants, green colorants, black colorants, and combinations thereof.

Colorants used in conjunction with ElectroInk® based systems are known in the art. In particular, the colorant and resin are mixed to form a colored polymer particle. In an embodiment, the toner composition includes a pigmented resin, where the pigment can include, but is not limited, cyan pigments, magenta pigments, yellow pigments, violet pigments, orange pigments, green pigments, black pigments, and combinations thereof. In particular, the colorant is a cyan pigment or a black pigment. In an embodiment, the colorant is a cyan colorant. The colorant is about 0.1% to 80% by weight of the toner composition.

In an embodiment, the toner composition can include a charge adjuvant. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Cu salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium, and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an embodiment, the charge adjuvant is aluminum tristearate. In an embodiment, the charge adjuvant is about 0.1 to 5% by weight of the toner composition. In another embodiment, the charge adjuvant is about 0.5 to 4% by weight of the toner composition. In another embodiment, the charge adjuvant is about 1 to 3% by weight of the toner composition.

The charge director can include, but is not limited to, lecithin, oil-soluble petroleum sulfonates (e.g., neutral Calcium Petronate™ neutral Barium Petronate™, and basic Barium Petronate™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminum salts of sulfonic acid. The sulfonic acids may include, but are not limited to, alkyl sulfonic acids, aryl sulfonic acids, and sulfonic acids of alkyl succinates (e.g., See, WO 2007/130069). In an embodiment, the charge director is about 0.001 to 1% by weight of the toner composition. In another embodiment, the charge director is about 0.001 and 0.15% by weight of the toner composition.

In an embodiment, the toner composition can be prepared by mixing a resin, treated fluoropolymer particles, and the liquid carrier, and heating to achieve a homogeneous mixture. The mixture is cooled to achieve a mash consistency. Additional components (e.g., a colorant, a charge adjuvant, a charge director, a surface modifier, compatibility additives, charging additives, transfer additives, and other additives) could be added to the mixture during the heating process and/or are ground with the mixture to form the final toner composition.

While embodiments of the present disclosure are described in connection with Examples and the corresponding text and figures, there is no intent to limit the disclosure to the embodiments in these descriptions. On the contrary, the intent is to cover alternatives, modifications, and equivalents included within the spirit and scope of embodiments of the present disclosure.

EXAMPLE 1

In this example we treated the PTFE particle with benzyl dimethyl hexadecyl ammonium chloride salt. This example illustrates the role of long hydrophobic tails, present in the salt, to the Van der Waal (VDW) interaction with the PTFE particle. In this example the long tail is the hexadecyl group.

First, benzyldimethylhexadecylammonium chloride is dissolved in methanol using a stirrer to make a 1M solution. Then, 50 g of PTFE particles were added to this 250 g solution while stirring for 2 h to create a homogenized PTFE particle dispersion. It should be noted that the reaction vessel cools down due to the endothermic salt adsorption onto the PTFE particles. After that, the treated PTFE particles were collected using filtration in Buchner funnel while rinsed with water.

Then, the filtered treated PTFE particles were deposited on the filter paper and were put in an oven at 45° C. for an hour to remove the water and methanol residuals.

The treated PTFE particles were added (about 4% of the solids) to electrophotographic ink (e.g., a liquid electrophotographic ink containing cyan pigments, a polymeric binder, compatibility additives, a charge control agent all dispersed in a liquid isoparraffinic carrier), and put in a shaker for homogenization for an hour. This was compared to the same electrophotographic ink using untreated PTFE particles.

The two electrophotographic inks, with the treated and untreated PTFE particles, were put in the press and run for 10,000 impressions. At each 1000 impressions, equal to 250 print copies, the press runs on a 'White' mode—meaning without printing any images. In this mode, the ink was not consumed but repeatedly exposed to a high electric field of around 1500 V/cm in the developing compartment. The purpose of this exposure is to simulate the most extreme condition that can lead to PTFE particle agglomeration.

After 1000 impressions, the press printed 5 copies of 100% coverage print sheet. After 10,000 impressions there are 10 samples of 100% coverage prints for both the treated and untreated PTFE particles in the electrophotographic inks. These were scanned and the count of white spots, the print quality defect caused by the presence of agglomerated PTFE particles, were determined. Usually, the count was averaged over at least 3 scans of the printed sheet. In the untreated PTFE particles ink, the white spot count grew as expected throughout the experiment. The white spot size did not change. However, the sample with treated PTFE particles showed no preponderance to the formation of white spots suggesting that no visible agglomeration took place.

EXAMPLE 2

In this example the PTFE particles were treated with hydroxylammonium chloride salt. This material did not have a long hydrophobic tail and, and we believe this negates the agglomeration mainly by the electrical discharge mechanism detailed above.

First, hydroxylammonium chloride was dissolved in methanol using a stirrer to make a 1M solution. Then, 50 g of PTFE particles was added to this 250 g solution while stirring for 2 h to obtain a homogenized PTFE particle dispersion. It should be noted that the reaction vessel cools down due the endothermic adsorption of the salt to the PTFE particles. After that, the treated PTFE particles were collected using filtration in a Buchner funnel while rinsed with water.

Then, the filtered treated PTFE particles were deposited on the filter paper and was put in an oven at 45° C. for an hour to remove the water and methanol residuals.

The treated PTFE particles were added (about 4% of the solids) to electrophotographic ink (e.g., a liquid electrophotographic ink containing cyan pigments, a polymeric binder, compatibility additives, a charge control agent all dispersed in a liquid isoparraffinic carrier), and put in a shaker for homogenization for an hour. This was compared to the same electrophotographic ink using untreated PTFE particles.

The two electrophotographic inks, with the treated and untreated PTFE particles, were put in the press and run for 10,000 impressions. At each 1000 impressions, equal to 250 print copies, the press runs on a 'White' mode—meaning without printing any images. In this mode the ink was not consumed but repeatedly exposed to a high electric field of around 1500 V/cm in the developing compartment. The purpose of this exposure was to simulate the most extreme condition that can lead to PTFE particle agglomeration.

After 1000 impressions, the press printed 5 copies of 100% coverage print sheet. After 10,000 impressions there were 10 samples of 100% coverage prints for both the treated and untreated PTFE particles in the electrophotographic inks. These were scanned and the count of white spots, the print quality defect caused by the presence of agglomerated PTFE particles, was determined. Usually, the count was averaged over at least 3 scans of the printed sheet. In the untreated PTFE particles ink, the white spot count grew as expected throughout the experiment. The white spot size did not change. However, the sample with treated PTFE particles showed no preponderance to the formation of white spots, suggesting that no visible agglomeration took place.

EXAMPLE 3

In this example the PTFE particles were treated with didodecyl dimethyl ammonium bromide salt. This example describes another example describing the impact of the hydrophobic tails in the interaction between the ammonium salt and the PTFE particle surface despite the early rise normal agglomeration.

First, didodecyl dimethyl ammonium bromide was dissolved in methanol using a stirrer to make a 1M solution. Then, 50 g of PTFE particles was added to this 250 g solution while being stirred for 2 h to form a homogenized PTFE particle dispersion. It should be noted that the reaction vessel cools down due to the endothermic dissolution adsorption of the ammonium salt. After that, the treated PTFE particles were collected using filtration in a Buchner funnel while rinsed with water.

Then, the filtered treated PTFE particles were deposited on the filter paper and was put in an oven at 45° C. for an hour to remove the water and methanol residuals.

The treated PTFE particles were added (about 4% of the solids) to electrophotographic ink (e.g., a liquid electrophotographic ink containing cyan pigments, a polymeric binder, compatibility additives, and a charge control agent all dispersed in a liquid isoparraffinic carrier), and put in a shaker for homogenization for an hour. This was compared to the same electrophotographic ink using untreated PTFE particles.

The two electrophotographic inks, with the treated and untreated PTFE particles, were put in the press and run for 10,000 impressions. At each 1000 impressions, equal to 250 print copies, the press runs on a 'White' mode—meaning without printing any images. In this mode the ink was not consumed but repeatedly exposed to a high electric field of around 1500 V/cm in the developing compartment. The purpose of this exposure is to simulate the most extreme condition that can lead to PTFE particle agglomeration.

After 1000 impressions, the press printed 5 copies of 100% coverage print sheet. After 10,000 impressions there are 10 samples of 100% coverage prints for both the treated and untreated PTFE particles in the electrophotographic inks. These were scanned and the count of white spots, the print quality defect caused by the presence of agglomerated PTFE particles, was determined. Usually, the count was averaged over at least 3 scans of the printed sheet. In the untreated PTFE particles ink the white spot count grew as expected throughout the experiment. The white spot size did not change. However, the sample with treated PTFE particles showed no preponderance to the formation of white spots suggesting that no visible agglomeration took place.

Figure 2:
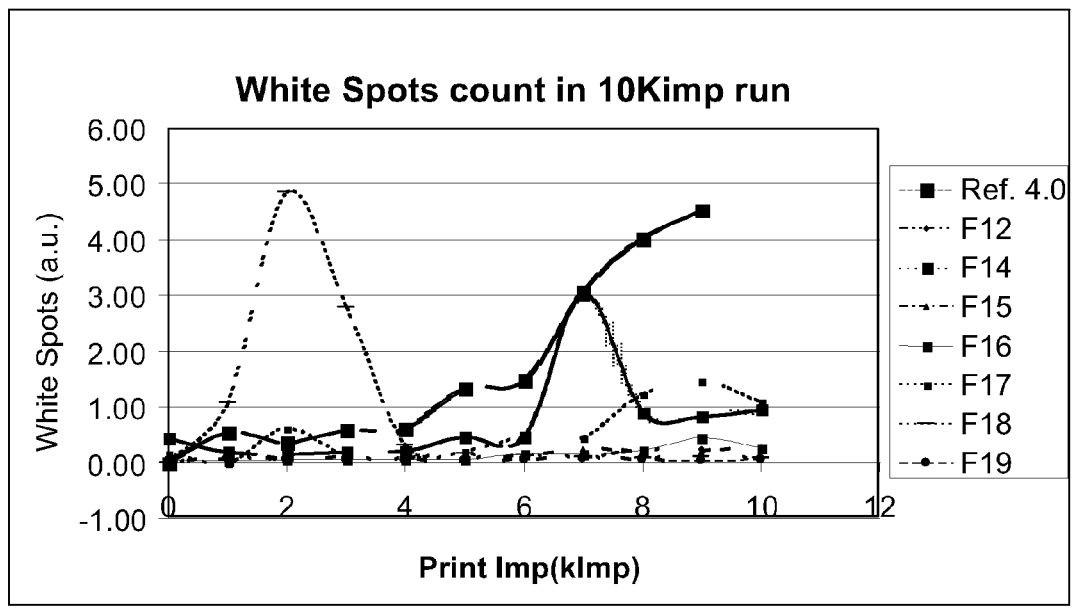
FIG. 2 illustrates a graph showing the results of the number of white spots created over a cycle job of 10 k impressions and seen in the printing of cyan monitors, each 1 k impression.

Discussion:

FIG. 2 illustrates the results of the number of white spots seen in the 1 k cyan monitor prints created over a cycle job of 10 k impressions. In order to have equivalent comparison, these white spot counts in each experiment were normalized to a scanning cube.

FIG. 2 Legend:
F12—PTFE particle.
F13—PTFE particle treated with tetra Butylammonium Bromide.
F14—PTFE particle treated with Hydroxylammonium Chloride.
F15—PTFE particle treated with Octadecyl trimethyl ammonium Bromide.
F16—PTFE particle treated with tetramethyl ammonium chloride.
F17—PTFE particle treated with tetraethylammonium chloride.
F18—PTFE particle treated with didodecyl dimethyl ammonium bromide.
F19—PTFE particle treated with BenzylDiMethylHexaDecylAmmonium Chloride.
F20—PTFE particle treated with tetraHeptyl ammonium Bromide.

The examples above illustrate the impact of the treatment of TEFLON® particles with ammonium salts.

Example 1 illustrates a formulation including an ammonium salt composed of a long hydrophobic tail that interacts with a PTFE particle surface by the London dispersion forces (transient dipole-dipole interaction) to cover the entire surface and interfere with the agglomeration by means of steric interference and electrostatic repulsion.

When comparing the number of white spots with this treated PTFE particles sample, named as F19, to the untreated PTFE particles sample, F12, the number of white spots was reduced from 4.54 spots per cubic cm to 0.06 spots per cubic cm. This is 1.3% from the reference and well within the error of the measurement. This level is regarded as a zero level of white spots and provides a solid clean print.

Example 2 illustrates a formulation, contrary to the previous example, having an ammonium salt that does not have any tail, and the nitrogen is bound to hydroxyl groups. For these treated PTFE particles one would expect no steric hinderance of the agglomeration. This case is a good example of hinderence by electrical discharge of the PTFE particles. The data shows that a comparison of the 'treated' PTFE particles, named as F14, one will see that its level is 0.97 spots per cubic cm vs. 4.54 spots per cubic cm in the reference. However, it is also apparent that when using electrical discharge as a mechanism, there will be a point when the charge accumulation will be in excess of the discharge rate, and hence, some white spots will form. This is apparent at the 7K point where there is a sudden spike in the number of white spots that quickly dissipates.

Example 3 illustrates another formulation showing the successful positive impact of long tail salt adsorption on the PTFE particle surface. Despite the rise in the white spots level in early stages of the experiment probably due to initial agglomeration of the prepared treated PTFE particles that were not ground, the level it reaches at the end is zero. Since, the laboratory process can also provide a natural agglomeration of PTFE particles (chunks) that are added without being ground into a powder, at the beginning pseudo white spots are observed. As the agglomerate breaks down to smaller particles the steric interference and electrostatic repulsion prevents the agglomeration under the application of high electric field. As a result, very low counts of white spots are counted (0.08 per cubic cm scanned) in comparison to the 4.54 per cubic cm of the reference. This level is only seen with the treated PTFE particles and is 1.7% of the reference level.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed is:

1. A toner composition, comprising: a carrier liquid, a resin, and treated fluoropolymer particles, wherein the treated fluoropolymer particles include fluoropolymer particles having ammonium halide salts disposed on the surfaces of the fluoropolymer particles; wherein the resin is a pigmented resin and wherein the treated fluoropolymer particles do not substantially agglomerate under an electrical field.

2. A particle, comprising:
a treated fluoropolymer particle, wherein the treated fluoropolymer particle includes a fluoropolymer particle having ammonium halide salts disposed on the surface of the fluoropolymer particle, wherein treated fluoropolymer particles do not substantially agglomerate under an electrical field.

3. A number of treated fluoropolymer particles according to the particle of claim 2, wherein the treated fluoropolymer particles include a fluorine-containing polymer selected from the group consisting of: a homopolymer, a copolymer, a terpolymer, a fluoroelastomer, and combinations thereof.

4. The particles of claim 3, wherein the fluoropolymer particles are selected from the group consisting of: a polytetrafluoroethylene (PTFE) particle, a perfluoroalkoxy polymer resin (PFA) particle, a fluorinated ethylene-propylene (FEP) particle, and combinations thereof.

5. The particle of claim 2, wherein the ammonium halide salts are selected from the group consisting of: an alkyl ammonium anion salt, a dialkyl ammonium salt, a trialkyl ammonium salt, a quaternary ammonium salt, a mono-arylammonium salt, a di-arylammonium salt, a tri-arylammonium salt, and a tetra-arylammonium salt, and combinations thereof.

6. The particle of claim 5, wherein the quaternary ammonium salts are selected from the group consisting of: tetramethylammonium chloride, tetraethylammonium chloride, tetraheptylammonium bromide, didodecyldimethylammonium bromide, benzyldimethylhexadecylammonium chloride, tridodecylmethylammonium bromide, and combinations thereof.

7. A toner composition comprising: a treated fluoropolymer particle, wherein the treated fluoropolymer particle includes a fluoropolymer particle having ammonium halide salts disposed on the surface of the fluoropolymer particle; the toner composition further comprising a carrier liquid, a resin, and a number of treated fluoropolymer particles comprising said treated fluoropolymer particle, wherein the resin is a pigmented resin.

8. The toner composition of claim 7, wherein the fluoropolymer particles include a fluorine-containing polymer selected from the group consisting of: a homopolymer, a copolymer, a terpolymer, a fluoroelastomer, and combinations thereof.

9. The toner composition of claim 7, wherein the fluoropolymer particles are selected from the group consisting of: a polytetrafluoroethylene (PTFE) particle, a perfluoroalkoxy polymer resin (PFA) particle, a fluorinated ethylene-propylene (FEP) particle, and combinations thereof.

10. The toner composition of claim 7, wherein the pigmented resin includes a pigment selected from: a cyan pigment, a violet pigment, a green pigment, and a black pigment.

11. The toner composition of claim 10, wherein pigment is a cyan pigment.

12. The toner composition of claim 7, wherein the ammonium halide salts are selected from the group consisting of: an alkyl ammonium anion salt, a dialkyl ammonium salt, a trialkyl ammonium salt, a quaternary ammonium salt, a mono-arylammonium salt, a di-arylammonium salt, a tri-arylammonium salt, and a tetra-arylammonium salt, and combinations thereof.

13. The toner composition of claim 12, wherein the quaternary ammonium salts are selected from the group consisting of: tetramethylammonium chloride, tetraethylammonium chloride, tetraheptylammonium bromide, didodecyldimethylammonium bromide, benzyldimethylhexadecylammonium chloride, tridodecylmethylammonium bromide, and combinations thereof.

14. The toner composition of claim 7, wherein the carrier liquid is a compound having a resistivity in excess of about $10^9$ ohm-cm and a dielectric constant below about 3.0.

15. The toner composition of claim 7, wherein the carrier liquid is a compound selected from the group consisting of: an aliphatic hydrocarbon, an isoparaffinic compound, a paraffinic compound, a dearomatized hydrocarbon compound, and combinations thereof.

16. The toner composition of claim 7, wherein the carrier liquid includes a charge director.

17. A method of making a toner composition, comprising:
dispersing fluoropolymer particles in a solvent;
treating the fluoropolymer particles with a solution of ammonium halide salts to form treated fluoropolymer particles, wherein the ammonium halide salts are disposed onto the surfaces of the fluoropolymer particles;
removing any non-bonded or non-absorbed ammonium halide salts from the treated fluoropolymer particles; and
mixing the treated fluoropolymer particles with a carrier liquid and a resin.

18. The method of claim 17, wherein the carrier liquid is a compound having a resistivity in excess of about $10^9$ ohm-cm and a dielectric constant below about 3.0.

19. The method of claim 18, wherein the fluoropolymer particles include a fluorine-containing polymer selected from the group consisting of: a homopolymer, a copolymer, a terpolymer, a fluoroelastomer, and combinations thereof.

20. The method of claim 18, wherein the ammonium halide salts are selected from the group consisting of: a polytetrafluoroethylene (PTFE) particle, a perfluoroalkoxy polymer resin (PFA) particle, a fluorinated ethylene-propylene (FEP) particle, and combinations thereof.

21. The method of claim 18, wherein the ammonium halide salt is selected from the group consisting of: an alkyl ammonium anion salt, a dialkyl ammonium salt, a trialkyl ammonium salt, a quaternary ammonium salt, a mono-arylammonium salt, a di-arylammonium salt, a tri-arylammonium salt, and a tetra-arylammonium salt, and combinations thereof.

* * * * *

UNITED STATES PATENT AND TRADEMARK OFFICE
CERTIFICATE OF CORRECTION

PATENT NO. : 8,669,034 B2  Page 1 of 1
APPLICATION NO. : 13/122522
DATED : March 11, 2014
INVENTOR(S) : Elliad Silcoff et al.

It is certified that error appears in the above-identified patent and that said Letters Patent is hereby corrected as shown below:

In the Claims

In column 14, lines 25-26, in Claim 20, delete "ammonium halide salts" and insert -- fluoropolymer particles --, therefor.

In column 14, line 31, in Claim 21, delete "salt is" and insert -- salts are --, therefor.

Signed and Sealed this
Eighth Day of July, 2014

Michelle K. Lee
*Deputy Director of the United States Patent and Trademark Office*